TUNER FOR TELEVISION RECEIVERS OR THE LIKE

Filed April 13, 1953 3 Sheets-Sheet 1

HEMAN LESLIE HOFFMAN
*INVENTOR.*

BY [signature]

HIS ATTORNEY

TUNER FOR TELEVISION RECEIVERS OR THE LIKE

Filed April 13, 1953

3 Sheets-Sheet 2

HEMAN LESLIE HOFFMAN
*INVENTOR.*
BY [signature]
HIS ATTORNEY

HEMAN LESLIE HOFFMAN
*INVENTOR.*

BY [signature]

HIS ATTORNEY

Patented Oct. 12, 1954 2,691,724

UNITED STATES PATENT OFFICE 2,691,724

TUNER FOR TELEVISION RECEIVERS OR THE LIKE

Heman Leslie Hoffman, San Marino, Calif., assignor to Hoffman Radio Corporation, a corporation of California Application April 13, 1953, Serial No. 348,383

2 Claims. (Cl. 250—16)

This invention relates, in general, to tuners for television receivers or the like. More specifically, this invention relates to an insertable cartridge type of tuner for use in television receivers.

As is well known, the commercial television bands are divided, broadly, into two parts, namely, the VHF band of frequencies and the UHF band of frequencies. Until recent months the major activity, in fact substantially the entire activity of commercial television, was confined to the VHF band. As a result of recent decisions by governmental regulating agencies, licenses are being granted for operation of commercial transmitters in which is referred to as the UHF band. Not all areas which are now serviced by VHF television stations will have UHF stations and, contrariwise, not all of the areas which will ultimately have television service will have VHF service. Thus, a problem confronts the purchaser of television receivers, namely, that of determining whether he should obtain a television receiver capable, at the time of purchase, of receiving the UHF and VHF stations or VHF stations alone. The manufacturer of such receivers is, correspondingly, confronted with the problem of providing receivers which will meet the demands of the individuals requiring both types of service as well as those requiring only one or the other type of service. It is desirable from the standpoint of both the television manufacturer and the home user of television receivers that only those receivers which will be used in areas providing UHF service will be burdened with the cost of tuners for the UHF band. Various methods for meeting this problem have been proposed. Among these methods is that of supplying tuner strips which are substantially fixed in their frequency of performance, and are designed for insertion in the turret type of television receiver. The problem confronted here is that it is not feasible with a turret type of tuner to provide strips to cover all of the UHF channels as well as all the VHF channels. It is difficult for the manufacturer to predetermine which strips should be provided with which television receivers as they leave his manufacturing plant and, further, it is quite possible that the television receiver purchaser will move from one area to another and at each move will be confronted with the problem of acquiring new and different types of UHF tuning strips.

It is an object, therefore, of this invention to provide an improved combination of television receiver and UHF band tuner.

It is a further object of this invention to provide a television receiver which is adapted to receive with a minimum of inconvenience to the television receiver owner, a tuner for the UHF band of television signals.

It is an additional object of this invention to provide, in a television receiver, a first tuner for a first range of television frequencies and a second tuner for a second range of television frequencies, the first tuner being permanently connected in the receiver and the second tuner being removably connected in the receiver and being tunable throughout the extent of the second range of television frequencies.

A still further object of this invention is to provide a cartridge type of UHF tuner which, when inserted in a television receiver adapted to receive such a tuner, can control activation of either the permanently connected VHF tuner in the receiver or, alternatively, activation of the inserted UHF tuner, all by means of a switch carried by the UHF cartridge tuner.

In accordance with this invention there is provided a UHF tuner carrying connector plugs and a television receiver having a space for receiving such cartridge and carrying at the rear of the space or channel, connector jacks which engage the plugs on the UHF tuner cartridge. Power input to and output from the VHF tuner normally operated in the receiver now passes into the VHF tuner cartridge and is there controlled by means of a so-called "function switch" which determines whether the VHF tuner or the UHF tuner is effectively in operation. The insertion of the UHF cartridge tuner into the allotted channel space on the television receiver can be used to actuate an automatic mechanism for disconnecting jumper or shunting wires which interconnect the jack connectors mounted in the television receiver. Upon removal of the UHF tuner cartridge these jumpers or shunts may be made to automatically re-engage the jack connector so that normal VHF operation may be utilized. The insertion of the jumper plugs in the absence of the UHF tuner may, of course, be done through manual means.

The features of the present invention which are believed to be novel are set forth with particularity in the appended calims. The present invention itself, both as to its organization and manner of operation, together with further objects and advantages thereof, may best be understood by reference to the following description, taken in connection with the accompanying drawings, in which.

Figure 1:
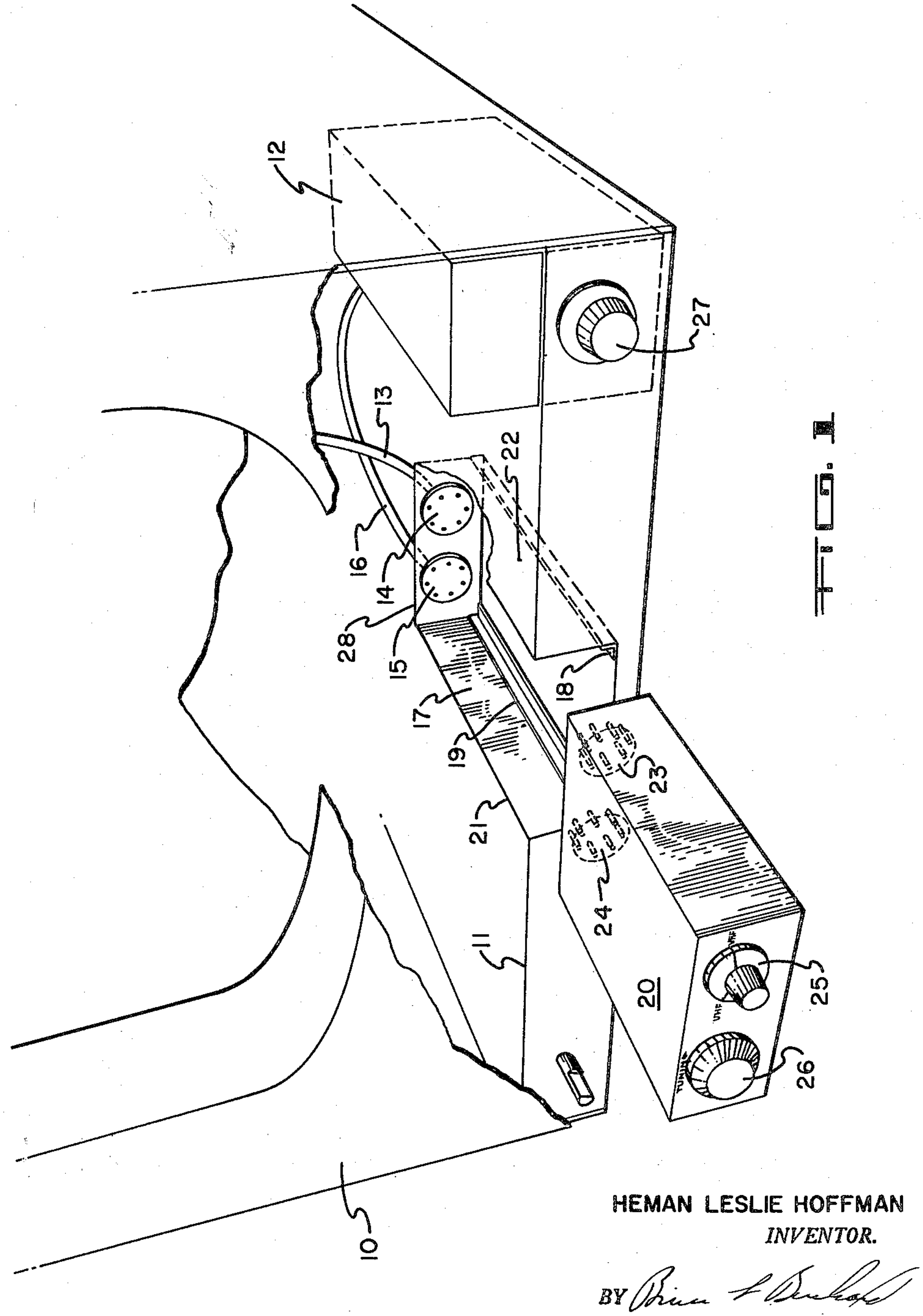
Figure 1 is a perspective view, partially broken away, of a television receiver UHF cartridge, according to this invention.

Referring now to Figure 1, television receiver 10 includes chassis 11 which carries a first tuner permanently installed therein. This tuner 12 may be chosen for the so-called VHF channels. Plate and filament power for tuner operation passes through cable 13 to jack connector 14 on chassis 11. Radio frequency energy from an external antenna, not shown, also passes to jack connector 14 through cable 13. The exact details as to the types of voltages and signals passing through this cable can be determined from the details of Figure 2. The plate and filament power for operating the VHF tuner 12 pass from jack connector 15 through cable 16 to that VHF tuner 12. In addition, intermediate frequency signals which constitue the output from VHF tuner 12 pass from that tuner through cable 16 to jack connector 15. Details of potentials which are carried by cable 16 may be determined by reference to Figure 2. Jack connectors 14 and 15 are carried on the rear wall 28 of recess 17 in chassis 11. This recess has lower edges 18 and 19 which may act as guide channels. Tuner cartridge 20 has its dimensions chosen so it fits snugly between side walls 21 and 22 of recess 17, and so that, with its bottom side resting on channels or edges 18 and 19, plug connectors 23 and 24, carried on the rear of cartridge 20, will engage jack connectors 14 and 15, respectively, mounted in the rear wall 28 of recess 17, as hereinbefore described. Of course, the positioning of plug connectors 23 and 24 is chosen so that such engagement will take place upon insertion of cartridge 20 in recess 17. With the cartridge 20 in position in recess 17 and the plug and jack connectors engaged, selective operation of either VHF tuner 12 or UHF tuner 20 may be effected by operation of function switch 25 to the appropriate one of its two positions. The effect of the switching is shown in further detail in Figure 2. Tuning control 26 on the front of tuner cartridge 20 may be adjusted to the desired television channel in the UHF range. Control 27 effects corresponding tuning action in VHF tuner 12.

Figure 2:
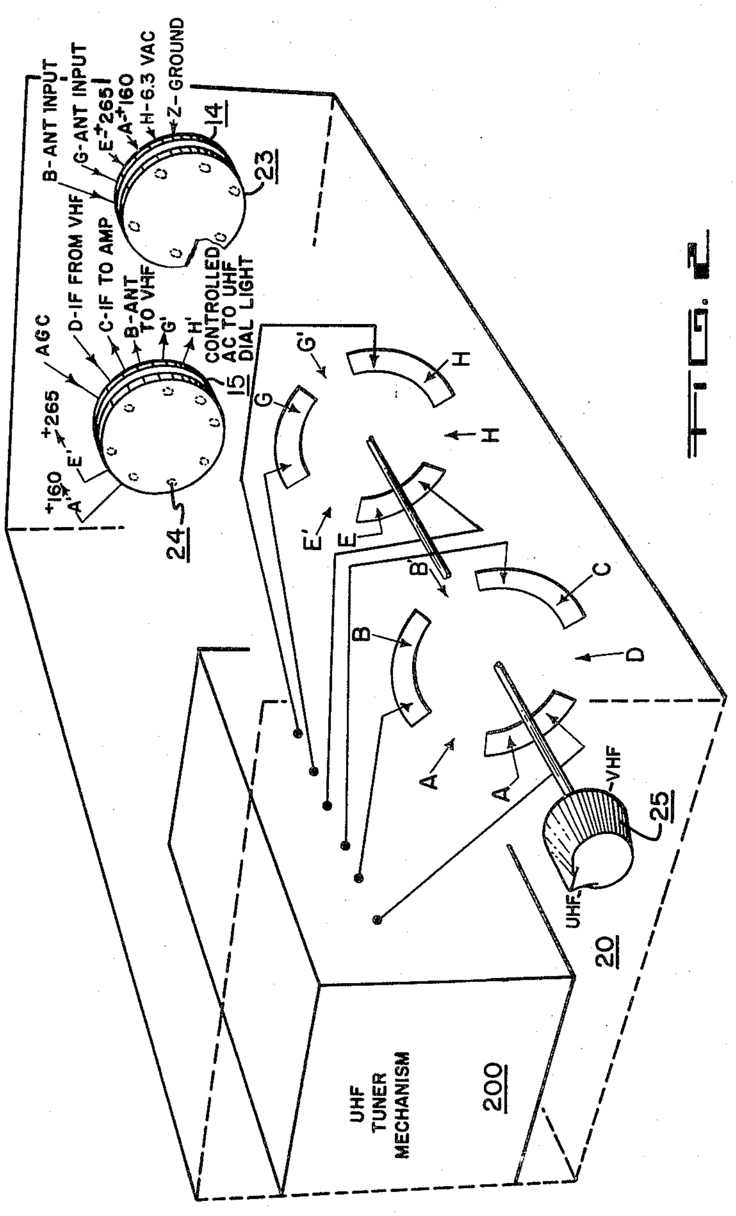
Figure 2 is a sketch, partially in block form and partially in schematic form, showing the connections and connecting elements and switches associated with the UHF tuner cartridge, according to this invention.

Referring now to Figure 2, positive high voltage, positive low voltage, low voltage alternating current and ground currents flow to jack connector 14 carried on the rear wall 28 of recess 17 of Figure 1 through connectors E, A, H and Z. Radio frequency currents from the receiving antenna pass to positions on jack connector 14 through connectors B and G, respectively. Each of the jack positions on jack connector 14 has a cooperating and engaging plug position on plug connector 23. Each of the aforementioned potentials pass, therefore, through plug connector 23 from jack connector 14 to positions on function switch 25, carrying corresponding designations to those shown in connection with the connectors and cabling. The connectors so carrying these potentials from plug connector 23 to the appropriate positions on function switch 25 are not shown. Ground lead designated Z does not pass to this switch but, instead, goes directly to the UHF tuner, possibly through the metallic casing of cartridge 20. Generally, the purpose of function switch 25 is to determine whether these potentials are applied to the UHF tuner mechanism 200 or to the VHF tuner mechanism 12. The selection is effected by means of multiple combinations of single pole, double throw switches of well-known types. Function switch 25 is shown in position for activation of UHF tuner mechanism 200, in which position no potential appears at position A', E', B', G' or H' on plug and jack connectors 24 and 15, respectively. Thus, no plate or RF potential is applied to VHF tuner 12, and the dial light on that unit is not lit, a signal of the inoperative condition of the VHF tuner in this position of the function switch. Instead, all these potentials are applied to UHF tuner mechanism 200. The trial light carried by that unit is lighted to indicate such operation. The intermediate frequency signal flowing to the appropriate amplifying mechanism in the remaining parts of television receiver 10 is, in the UHF position of the switch, shown being derived from UHF tuner mechanism 200 and passing through function switch 25 and position C on plug and jack connectors 24 and 15, respectively. Obviously, switching of function switch 25 to its alternate position, shown as "VHF" results in the application of the operating potentials to VHF tuner 12 through function switch 25 and plug and jack connectors 24 and 15, respectively. Further, the dial light on the VHF tuner is, in that position of the function switch, lighted. Thus, it can be seen that upon insertion of tuner cartridge 20 in recess 17 of chassis 11 and interconnection of plug connectors 24 and 23 with jack connectors 15 and 14, respectively, selective control of the operation of either VHF tuner 12 or UHF tuner mechanism 200 may be effected by operation of function switch 25.

Upon removal of cartridge 20 and the disconnection of plug connector 24 from jack connector 15 and, correspondingly, disconnection of plug connector 23 from jack connector 14, VHF tuner 12 would have no operating potential applied to it unless means were provided for interconnecting the appropriate positions on jack connector 14 with corresponding positions on jack connector 15. This may be done manually by inserting jumper bar 300, shown in Figure 3. Jumper bar 300 carries two plug connectors 301 and 302, corresponding to the plug connectors carried on the rear of tuner cartridge 20. The positions on plug connector 301 are connected to corresponding positions on plug connector 302 so that wires A, B, E, G and H in cable 13 are connected to wires A', B', E', G' and H' in cable 16. Also, wires C and D in cable 16 are connected together so that the intermediate frequency output of tuner 12 may be fed to the appropriate amplifier stage. Of course, when it is desired that the tuner cartridge 20 be inserted for operation of the television receiver on the UHF channel frequencies, it is necessary to remove jumper bar 300 manually.

Figures 3, 4, 5:
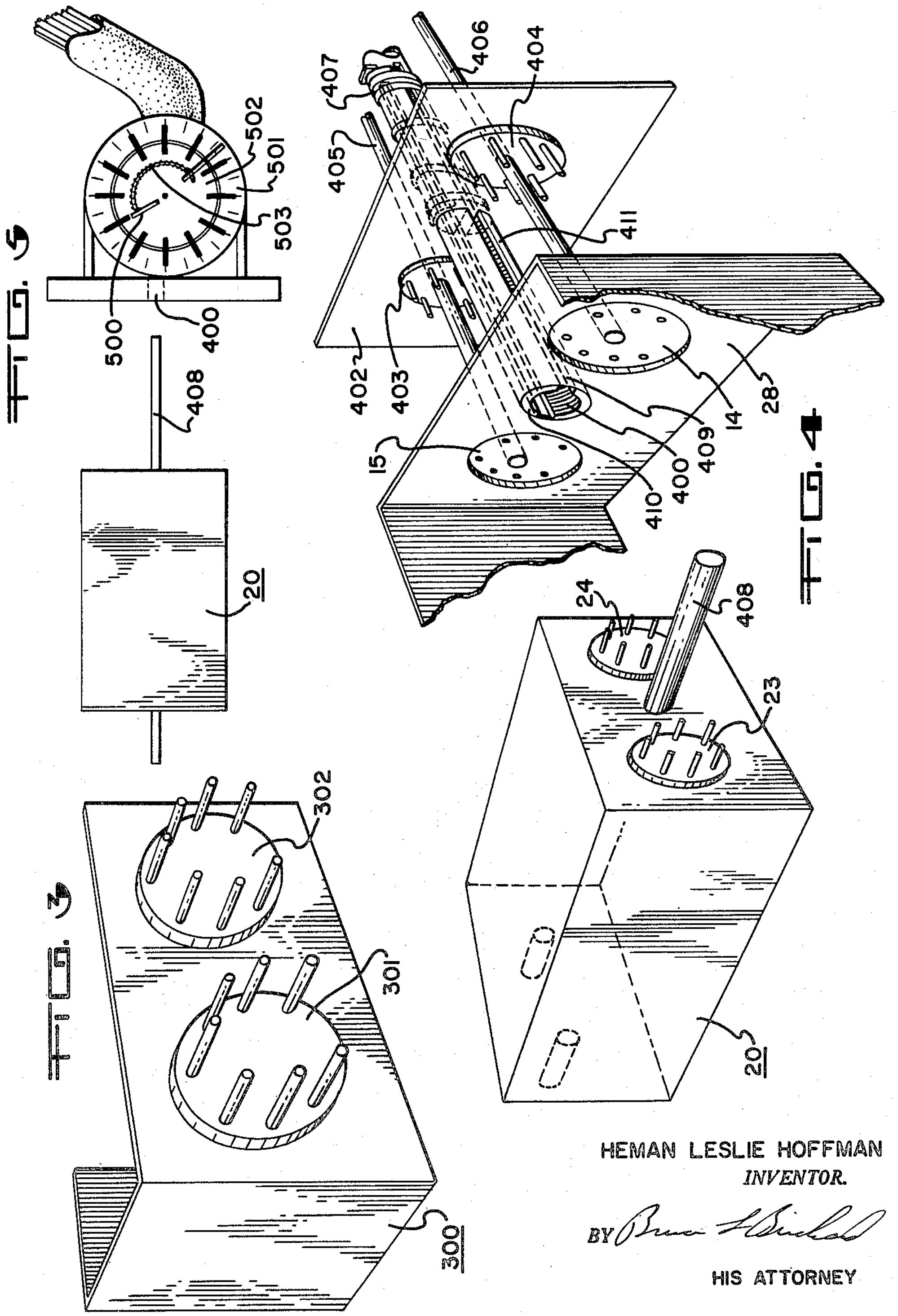
Figure 3 illustrates a jumper or shunting element which may be manually inserted in place of the tuner cartridge, according to this invention.
Figure 4 illustrates an automatic mechanism for shunting or jumper action in the absence of the tuner cartridge of this invention.
Figure 5 illustrates an alternate automatic form of jumper or shunting mechanism for use in connection with this invention.

In Figure 4 there is disclosed a mechanism which obviates the need for manually inserting and removing a jumper bar. Jack connectors 14 and 15 are carried in the rear wall of the recess 17, as before. The jacks in the various positions around connectors 14 and 15 are constructed to receive plug connectors from either side of the back wall 28 of recess 17. An aperture is provided in that back wall and a hollow cylinder is mounted normal to the back wall and concentric with the aperture 400. This hollow cylinder 401 slidably supports plate 402 which carries plug connectors 403 and 404 in substantial alignment with jack connectors 15 and 14, respectively. Rods 405 and 406 pass through the centers of the combination of plug 403 and jack 15, and plug connector 404 and jack connector 14, respectively. These rods help to assure coaxial alignment of associated plug connectors and jack connectors. Helical spring 407 urges plate 402 towards the back wall of recess 17 with sufficient force so that the plug connectors 403 and 404 are forced into good electrical contact with jack connectors 15 and 14, respectively. Conductors interconnect positions on plug connector 404 with the appropriate positions on plug connector 403 to effect the jumper or shunting action described in connection with the manually operated device of Figure 3. Tuner cartridge 20 carries plug connectors 23 and 24, as described previously, and in addition carries, substantially, intermediate connectors 23 and 24, locating stub 408, which has the same general peripheral contour as aperture 400. Stub 408 is substantially longer than any of the plug elements on connectors 23 and 24. Cylinder 401 has opposed slots 409 and 410 in diametrically opposed wall portions. Diametric strip 411, which is integral with plate 402, engages these two slots and helps to orient plate 402 and the plug connectors carried thereby. Further, upon insertion of cartridge 20 in recess 17 of the television chassis 11, stub 408 enters cylinder 401 and engages strip 411 so that, upon continued pressure on the cartridge, plate 402 is forced away from the back plate of recess 17 and plug connectors 403 and 404 are disconnected from jack connectors 15 and 14, respectively. Plug connectors 24 and 23 are now connected with jack connectors 15 and 14, and combination UHF-VHF operation may be attained, as described early in this disclosure. On removal of cartridge 20, plug connectors 403 and 404 will once again engage jack connectors 15 and 14 and, by reason of the interconnecting jumpers, only VHF operation will be possible.

In Figure 5 an alternative form of an automatic jumper mechanism is shown. Cartridge 20 once again carries stub 408 which, once again, passes through aperture 400 in the rear wall 28 of recess 17. In this device, stub 408 engages actuating surface 500 of rotary switch 501. Switch 501 is a multiple pole, double throw type of rotary switch available commercially, and is connected so as to effect the same end as is effected by the manual jumper shown in Figure 3, when cartridge 20 is not inserted in television receiver 10. Power is thus passed directly through the switch to the VHF tuner in the absence of cartridge 20. Correspondingly, radio frequency energy from an external antenna system, not shown, passes to the VHF tuner through switch 501 when it is in the VHF position. Upon insertion of cartridge 20, stub 408 engages actuating surface 500 and center section 502 thereof is rotated, compressing spring 503. Operating potentials and radio frequency signals now are passed to the function switch 25 of cartridge 20 through plug connector 23 and jack connector 14, as described earlier. Function switch 25 may, again, control whether the UHF tuner or the VHF tuner is made operative.

Upon removal of cartridge 20, stub 408 disengages actuating surface 500 and jack connectors 14 and 15 are by-passed or shunted as described previously.

The automatic jumpering devices disclosed in Figures 4 and 5 are, obviously, superior to the manual jumper bar shown in Figure 3, for there is no possibility where, by reason of the inoperativeness of cartridge 20 and loss of the jumper bar 300, the television receiver could not be operated even on the VHF channels. The use of jumper bar 300 is, however, a satisfactory expedient under most conditions.

It is clear from the foregoing discussion that there has been provided a useful combination of a removable cartridge tuner and a television receiver adapted to receive such a cartridge, so that either VHF operation alone or a combination of VHF and UHF television channel reception may be had by the owner of the television receiver, at his election. All of the purchasers of television receivers would not be burdened with the cost of the UHF tuner if the present invention were utilized. Only those who felt it was desirable to have this additional feature need pay the cost of the tuner cartridge. Once the cartridge had been purchased, however, it could provide satisfactory operation on any of the numerous UHF channels assigned to commercial television operation.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A television receiver including a first tuner tunable over a first range of frequencies, said tuner being connected to a first connector, a second connector connected to said receiver, said first and second connectors being arranged adjacent each other and corresponding terminals of these being interconnected, a second tuner tunable over a second range of frequencies, said second tuner being mounted in a container which has third and fourth connectors arranged adjacent each other and for registry with the first and second connectors, and connecting means operative by plugging said third and fourth connectors into said first and second connectors for disconnecting said interconnection and for connecting said first tuner or said second tuner to said receiver and switch means mounted on said container for selecting said first or second tuner.

2. The invention as described in claim 1 in which said first, second, third and fourth connectors are separate multi-contact devices.

References Cited in the file of this patent

UNITED STATES PATENTS

| Number | Name | Date |
|---|---|---|
| 2,033,492 | Stone, Jr. | Mar. 10, 1936 |
| 2,507,995 | Reid | May 16, 1950 |
| 2,581,194 | Lester et al. | Jan. 1, 1952 |
| 2,598,857 | Sziklai | June 3, 1952 |
| 2,662,975 | Schwarz | Dec. 15, 1953 |